United States Patent [19]

Shirai

[11] Patent Number: 4,812,777
[45] Date of Patent: Mar. 14, 1989

[54] MANUALLY/ELECTRICALLY OPERATED BRAKE SYSTEM

[75] Inventor: Kenji Shirai, Mishima, Japan

[73] Assignee: Toyota Jidosha Kabushiki Kaisha, Aichi, Japan

[21] Appl. No.: 71,131

[22] Filed: Jul. 8, 1987

[30] Foreign Application Priority Data

Jul. 12, 1986 [JP] Japan .................. 61-164234

[51] Int. Cl.⁴ .................. B60T 11/18; B60T 8/08
[52] U.S. Cl. .................. 303/14; 60/565; 60/582; 60/545; 188/358; 188/106 P; 188/151 A; 303/2; 303/6.01; 303/9.62; 303/10; 303/15; 303/16; 303/92; 303/114; 303/87; 303/100; 303/DIG. 3; 303/84.1
[58] Field of Search .................. 303/2, 3, 7–9, 303/10–12, 13–18, 119, 100, 116, 19–20, 93, 92, 50–52, 87, 117, 110, 114, DIGS. 3–4, 84.1, 84.2, 6.01, 9.61–9.76; 188/355–359, 151 A, 106 P, 156–158; 60/545, 565–566, 582

[56] References Cited

U.S. PATENT DOCUMENTS

| | | | |
|---|---|---|---|
| 3,507,542 | 4/1970 | Cannella | 303/15 X |
| 3,582,149 | 6/1971 | Berg | 303/15 X |
| 3,827,758 | 8/1974 | Hansen | 303/10 X |
| 3,887,238 | 6/1975 | Bennett | 303/10 X |
| 3,923,345 | 12/1975 | Poggie | 188/346 X |
| 4,117,769 | 10/1978 | Carre et al. | 91/170 R |
| 4,121,874 | 10/1978 | Knox et al. | 303/10 |
| 4,166,654 | 9/1979 | Snodgrass | 303/14 |
| 4,188,073 | 2/1980 | Ishikawa et al. | 303/87 |
| 4,235,316 | 11/1980 | Blomberg | 188/181 R |
| 4,258,958 | 3/1981 | Bloxham | 303/15 X |
| 4,307,916 | 12/1981 | Straut et al. | 303/15 X |
| 4,557,527 | 12/1985 | Stumpe | 303/15 |
| 4,572,335 | 2/1986 | Kobelt | 303/40 X |
| 4,591,213 | 5/1986 | Rapoport | 303/92 X |
| 4,597,610 | 7/1986 | Stumpe | 303/22.8 |
| 4,616,881 | 10/1986 | Müller et al. | 303/15 X |
| 4,658,939 | 4/1987 | Kircher et al. | 188/106 P X |
| 4,671,577 | 6/1987 | Woods | 303/20 X |
| 4,681,373 | 7/1987 | Nomura et al. | 303/96 X |
| 4,681,374 | 7/1987 | Nakamura et al. | 303/106 |

FOREIGN PATENT DOCUMENTS 58-188746 11/1983 Japan .

Primary Examiner—Douglas C. Butler
Attorney, Agent, or Firm—Parkhurst, Oliff & Berridge

[57] ABSTRACT

A manually/electrically operated brake system for applying a brake to a wheel of a vehicle, including a master cylinder operated by a brake operating member, to generate a manually controlled braking pressure according to an operation of the brake operating member, a wheel brake cylinder for applying a brake to the wheel, a primary fluid passage for connecting the master cylinder to the wheel brake cylinder, an electrically controlled pressure generating device for generating an electrically controlled braking pressure to produce a required braking effect determined based on at least one of an operating force and an operating stroke of the brake operating member, and a switching device provided in the primary fluid passage, for applying the electrically controlled braking pressure to the wheel brake cylinder while disconnecting the master cylinder from the wheel brake cylinder when the electrically controlled pressure generating device is normally functioning, and for applying the manually controlled braking pressure to the wheel brake cylinder while disconnecting the electrically controlled pressure generating device from the wheel brake cylinder when the electrically controlled pressure generating device is not normally functioning.

6 Claims, 3 Drawing Sheets

MANUALLY/ELECTRICALLY OPERATED BRAKE SYSTEM

BACKGROUND OF THE INVENTION

1. Field of the Invention

The present invention relates in general to a hydraulically operated brake system for an automotive vehicle, and more particularly to a manually/electrically operated brake system wherein a braking effect can be electrically controlled, and which is capable of applying an effective brake to the vehicle even in the event of an electrical failure of the system.

2. Discussion of the Prior Art

A hydraulically operated brake system is generally used in a motor vehicle as a service brake for decelerating or stopping the vehicle. This hydraulic brake system includes a master cylinder, a wheel brake cylinder, and a fluid passage connecting the master cylinder and the wheel brake cylinder. The master cylinder is adapted to generate a manually controlled braking pressure according to an operating of a brake operating member such as a brake pedal. The wheel brake cylinder receives the manually controlled braking pressure, and applies a brake to a wheel of the vehicle, for restraining the rotation of the wheel. In this type of manually operated brake system, the required operating stroke and force of the brake operating member are determined by an amount and a pressure of the brake fluid that is necessary to provide a desired braking force (hydraulic force provided by the wheel brake cylinder). The required operating stroke or force of the brake operating member may be reduced if a booster is provided between the operating member and the master cylinder. However, the reduction in the operating stroke is limited, and the braking force applied to the wheel is always commensurate with the operating force applied to the brake operating member. In the manually operated brake system, therefore, the operating feel of the brake operating member cannot be adjusted as desired.

Laid-open publication No. 58-188746 of Japanese Patent Application (published in 1983) discloses a hydraulically operated brake system for a motor vehicle, wherein a braking force applied to the vehicle wheel is not necessarily proportional to an operating force applied to a brake operating member. It is recognized that a rate of deceleration of the vehicle upon brake application to the wheels is not determined solely by the braking force generated by pistons of the wheel brake cylinders. Namely, the deceleration rate is affected by other factors such as a friction coefficient of a friction member of the wheel brakes, and a load on the vehicle. To obtain a consistent deceleration rate of the vehicle varying with the operating force, without being influenced by the other factors as indicated above, it is necessary to avoid direct proportioning of the braking force to the operating force applied to the brake operating member. To this end, the brake system disclosed in the above-idenfified document uses sensors for sensing the operating force applied to the brake operating member, and an actual rate of deceleration of the vehicle, and includes an electrically controlled actuator which is adapted to control the braking pressure to be applied to the wheel brakes, depending upon the detected brake operating force and deceleration rate of the vehicle. Described more specifically, the boosting ratio of a booster provided between the brake operating member and the master cylinder is electrically controlled to adjust the pressure of the brake fluid pressurized by the master cylinder and consequently the braking force generated by each wheel brake cylinder. Alternatively, an amplifier is disposed in a primary fluid passage connecting the master cylinder and the wheel brake cylinders, and the boosting ratio of the booster is electrically controlled to adjust the braking force generated by the wheel brake cylinders.

In the above hydraulically operated brake system, however, the braking pressue applied to the wheel brake cylinders is necessarily derived from the pressure generated in the master cylinder, which is merely electrically adjusted by means of the amplifier. Hence, the braking force generated by the wheel brake cylinders has a close relation with the operating stroke and force of the brake operating member. This indicates that the freedom to adjust the operating feel of the brake operating member is inevitably limited.

SUMMARY OF THE INVENTION

It is accordingly an object of the present invention to provide a manually/electrically operated brake system for applying a brake to a wheel of a vehicle, wherein the operating stroke and force of the brake operating member can be freely adjusted, independently of the required braking force generated by the wheel brake cylinder.

The above object can be achieved according to the principle of the present invention, which provides a manually/electrically operated brake system for applying a brake to a wheel of a vehicle, comprising: (a) a brake operating member; (b) a master cylinder operated by the brake operating member, to generate a manually controlled braking pressure according to an operation of the brake operating member; (c) a wheel brake cylinder for applying a brake to the wheel; (d) a primary fluid passage for connecting the master cylinder to the wheel brake cylinder; (e) electrically controlled pressure generating means for generating an electrically controlled braking pressure to produce a required braking effect which is determined based on at least one of an operating force and an operating stroke of the brake operating member; and (f) switching means provided in the primary fluid passage, for applying the electrically controlled braking pressure to the wheel brake cylinder while disconnecting the master cylinder from the wheel brake cylinder when the electrically controlled pressure generating means is normally functioning, and for applying the manually controlled braking pressure to the wheel brake cylinder while disconnecting the electrically controlled pressure generating means from the wheel brake cylinder when the electrically controlled pressure generating means is not normally functioning.

In the manually/electrically operated brake system of the present invention constructed as described above, the master cylinder is disconnected from the wheel brake cylinder by the switching means, and is activated by the the electrically controlled braking pressure produced by the electrically operated pressure generating means, while the electrically operated pressure generating means is normally functioning or intact. In the event of a failure of the electrically operated pressure generating means, the defective electrically operated pressure generating means is disconnected from the wheel brake cylinder, and the wheel brake cylinder is activated by the manually controlled braking pressure generated by the master cylinder. That is, the master cylinder is connected to the wheel brake cylinder by means of the switching means so that the braking pressure generated by the master cylinder is applied to the wheel brake cylinder, as in an ordinary manually operated hydraulic brake system.

It follows from the above description that during a normal operation of the electrically controlled pressure generating means, the operating stroke and force of the brake operative member have no direct relationship with the braking force generated by the wheel brake cylinder, since the wheel brake cylinder is disconnected from the master cylinder. Therefore, the operating stroke and force of the brake operating member can be freely adjusted, independently of the required braking force, and consequently the operating feel of the brake operating member can be easily enhanced.

Moreover, even in the event of a failure of the electrically controlled pressure generating means, the vehicle can be properly decelerated or stopped with the manually controlled braking pressure applied to the wheel brake cylinder. Thus, the instant brake system is assured of its safety of operation.

According to one feature of the invention, the switching means is operable to apply the one of the manually controlled braking pressure and the electrically controlled braking pressure which is higher than the other. The electrically controlled braking pressure is higher than the manually controlled braking pressure when the electrically controlled pressure generating means is functioning normally.

According to another feature of the invention, the brake system further comprises at lesat one fluid absorber connected to a part of the primary fluid passage between the switching means and the master cylinder, for temporarily accommodating a brake fluid having the manually controlled braking pressure delivered from the master cylinder upon operation of the brake operating member. Each fluid absorber is adapted to return the brake fluid therefrom to the master cylinder upon releasing of the brake operating member.

In one form of the above feature of the invention, the brake system further comprises absorber control means disposed between the above-indicated at least one fluid absorber and the primary fluid passage, for effecting fluid communication between the primary fluid passage and the at least one fluid absorber when the electrically controlled pressure generating means is normally functioning, and for disconnecting the at least one fluid absorber from the primary fluid passage when the electrically controlled pressure generating means fails to normally function.

According to the above form of the invention, a predetermined suitable amount of the pressurized brake fluid may be delivered from the master cylinder and temporarily accommodated in the at least one fluid absorber upon operation of the brake operation member during a normal operation of the electrically controlled pressure generating means, since the master cylinder disconnected from the wheel brake cylinder is brought into communication with the at least one fluid absorber under the control of the absorber control means. Thus, it is possible to avoid an excessively limited operating stroke of the brake operating member. If the electrically controlled pressure generating means becomes defective for some reason or other, the absorber control means operates to disconnect each fluid absorber from the master cylinder, to inhibit the absorber from accommodating the pressurized fluid from the master cylinder. Consequently, the entire volume of the brake fluid delivered from the master cylinder is supplied to the wheel brake cylinder, upon operation of the brake operating member in the event of a failure of the electrically controlled pressure generating means, whereby an unnecessary increase of the operating stroke of the brake operating member can be kept to a comparatively low level.

According to one arrangement of the above form of the invention, the operating stroke of the brake operating member can be adjusted by changing the volume of the brake fluid that can be accommodated in the at least one fluid absorber. For example, the at least one fluid absorber consists of a plurality of fluid absorbers. In this case, the absorber control means is adapted to control the plurality of fluid absorbers selectively in one of a plurality of operating modes associated with fluid communcation between the fluid absorbers and the primary fluid passage. According to one example, the plurality of fluid absorbers consist of a first fluid absorber and a second fluid absorber. In this instance, the absorber control means comprises a first solenoid-operated shutoff valve disposed between the first fluid absorber and the primary fluid passage, a second solenoid-operated shutoff valve disposed between the second fluid absorber and the primary fluid passage, and valve control means operable to control the first and second shutoff valves selectively in one of a first mode, a second mode and a third mode. In the first mode, the first and second shutoff valves are closed. In the second mode, one of the first and second is open. In the third mode, the first and second shutoff valves are open.

In accordance with a further feature of the invention, the electrically controlled pressure generating means comprises: a reservoir for storing a brake fluid; a pump for pumping the brake fluid from the reservoir; an accumulator for storing the brake fluid pumped by the pump, at a pressure within predetermined range; an operating-force sensor for sensing the operating force applied to the brake operating member; a braking-effect sensor for sensing an actual braking effect provided by the wheel brake cylinder; a solenoid-operated pressure regularing valve disposed in a fluid passage between the accumulator and the switching means, for supplying the electrically controlled braking pressure to the switching means, by reducing the pressure of the brake fluid supplied from the accumulator; and main control means for controlling the solenoid-operated pressure regulating valve such that the electrically controlled braking pressure is determined so that the actual braking effect sensed by the braking-effect sensor coincides with the required braking effect determined based on the operating force sensed by the operating-force sensor.

In one form of the above feature of the invention, a supply of an electric current to the solenoid-operated pressure regulating valve is inhibited when at least one of the main control means, the operating-force sensor and the braking-effect sensor fails to normally function.

BRIEF DESCRIPTION OF THE DRAWINGS

The above and other objects, features and advantages of the present invention will be better understood by reading the following detailed description of a preferred embodiment of the invention, when considered in conjunction with the accompanying drawings, in which.

DETAILED DESCRIPTION OF THE PREFERRED EMBODIMENT

Figure 1:
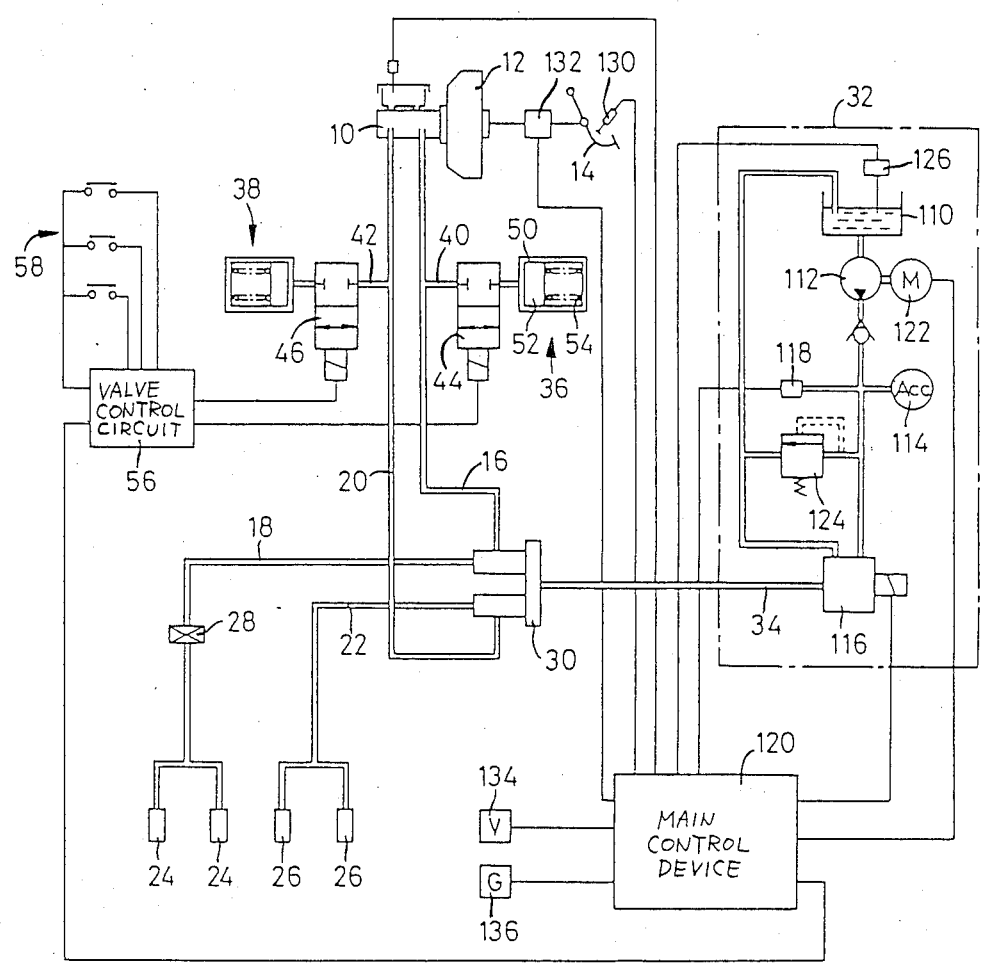
FIG. 1 is a circuit diagram illustrating one embodiment of a manually/electrically operated brake system of the present invention.

Referring first to FIG. 1, reference numeral 10 designates a master cylinder operated via a booster 12 by a brake operating member in the form of a brake pedal 14. The master cylinder 10, which is a first hydraulic pressure source for generating a manually controlled braking pressure, is of a tandem type having two pressurizing pistons disposed in series with each other. Upon depression of the brake pedal 14, the master cylinder 10 generates in its two mutually independent fluid chambers fluid pressures having the same level corresponding to an operating amount of the pedal 14. The fluid pressures generated in the fluid chambers are respectively applied to a pair of rear wheel brake cylinders 24, 24, and a pair of front wheel brake cylinders 26, 26, through respective first and second primary fluid passages. The first primary fluid passage consists of fluid passages 16, 18, while the second primary fluid passage consists of fluid passages 20, 22. A proportioning valve 28 is provided in the fluid passage 18 connected to the rear wheel brake cylinders 24, 24. The above arrangement of the instant brake system is similar to the arrangement of an ordinary manually operated brake system.

In the first and second primary fluid passages, there is disposed switching means in the form of a switching valve 30 such that the fluid passages 16, 20 are connected to the respective fluid passages 18, 22. This switching valve 30 is also connected to an electrically controlled second pressure source 32 via a fluid passage 34, so that the valve 30 applies to the wheel brake cylinders 24, 26 one of the manually controlled braking pressure received from the master cylinder 10, and an electrically controlled braking pressure generated by the secondary hydraulic pressure source 32, which is higher than the other. The switching valve 30 and the second pressure source 32 will be described later in detail.

The fluid passages 16, 20 are connected to a first and a second fluid absorber 36, 38, through fluid passages 40, 42, respectively. In these fluid passages 40, 42, there are disposed a first and a second solenoid-operated shutoff valve 44, 46, respectively. The first fluid absorber 36 has a housing 50, a piston 52 fluid-tightly and slidably received in the housing 50, and a biasing spring 54 acting on the piston 52 so that the piston 52 is biased toward its fully advanced position as indicated in FIG. 1. The first fluid absorber 36 is thus constructed to accommodate the pressurized brake fluid delivered from the master cylinder 10, in an amount proportional to the pressure of the fluid. The second fluid absorber 38 has the same construction as the first fluid absorber 36. The first and second solenoid-operated shutoff valves 44, 46 are controlled by valve control means in the form of a valve control circuit 56, which is connected to a selector switch 58 having three positions. Depending upon the position of the selector switch 58 selected by the vehicle operator, the solenoid-operated shutoff valves 44, 46 are selectively placed in one of three modes; a first mode in which both of the first and second shutoff valves 44, 46 are closed; a second mode in which one of the first and second shutoff valves 44, 46 is open; and a third mode in which both of the first and second shutoff valves 44, 46 are open. The valve control circuit 56 cooperates with the solenoid-operated shutoff valves 44, 46, to provide absorber control means for controlling fluid communication of the first and second fluid absorbers with respect to the fluid passages 16, 20 (master cylinder 10).

Figure 2:
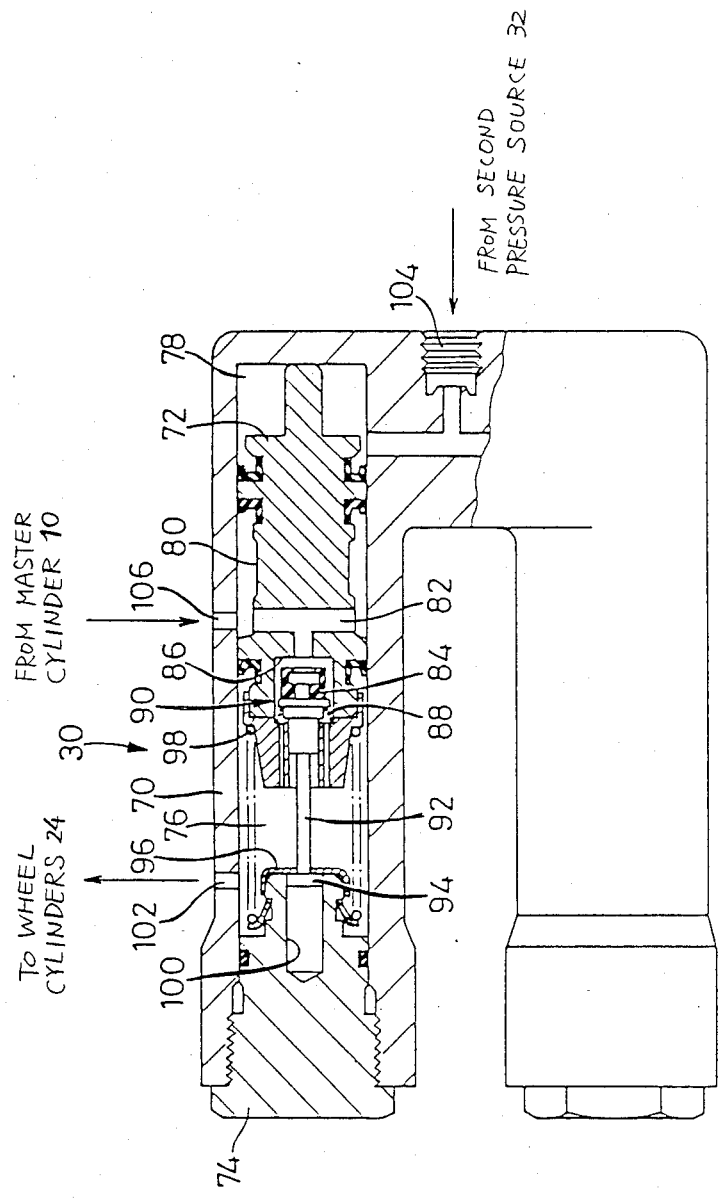
FIG. 2 is a front elevational view partly in cross section of a switching valve used in the brake system of FIG. 1.

Referring next to FIG. 2, the switching valve 30 has a one-piece housing structure consisting of two cylindrical housings 70 each of which has a bore closed at its one end. A piston 72 is slidably received in the bore of each housing 70, and the open end of the bore is closed by an end plug 74, whereby a first fluid chamber 76 and a second fluid chamber 78 are formed within the housing 70. The piston 72 has an annular groove 80 formed in the outer circumferential surface over a relatively length in the longitudinal direction. This groove 80 is held in communication with the first fluid chamber 76, through a communication hole 82 formed through the pistion 72. In the communication hole 82, there is disposed a check valve 90 which consists of a valve member 84, a valve seat 86, and a spring 88. The valve member 84 is supported at one end of a rod 92 which extends toward the end plug 74. The rod 92 has a head 94 at one of its opposite ends remote from the check valve 90. The head 94 engages a spring retainer 96 attached to the end plug 74. Between the spring retainer 96 and the piston 72, there is disposed a return spring 98 for biasing the piston 72 in a direction toward its fully retracted position shown in FIG. 2. In this fully retracted position, the check valve 90 is held open, with the valve member 84 spaced away from the valve seat 86 by the rod 92 against the biasing action of the spring 88, since the rod 92 is held stationary by the spring retainer 96. Thus, the spring retainer 96 cooperates with the rod 92 to open the check valve 90. The end plug 74 has a hole 100 parallel to the rod 92, so that the rod 92 is movable together with the piston 72. The first fluid chamber 76 is connected at a port 102 to the fluid passage 18, while the second fluid chamber 78 is connected at a port 104 to the fluid passage 34. The annular groove 80 is connected at a port 106 to the fluid passage 16.

While no fluid pressure is applied to the second fluid chamber 78, the check valve 90 is open, whereby the ports 106 and 102, i.e., the fluid passages 16, 18 are held in communication with each other, permitting the manually controlled braking pressure from the master cylinder 10 to be applied to the rear wheel brake cylinders 24, 24. When the pressure in the second fluid chamber 78 rises, the piston 72 is advanced, and the check valve 90 is closed to disconnect the fluid passage 18 from the fluid passage 16, whereby the pressure in the first fluid chamber 76 rises to a level substantially equal to that of the pressure in the second fluid chamber 78. Namely, the electrically controlled braking pressure generated by the second pressure source 32 is applied to the rear wheel brake cylinders 24, via the fluid passage 18, while the piston 72 is placed in its fully advanced position. The above operation also applies to the fluid passages 20, 22.

Referring back to FIG. 1, the second pressure source 32 has a reservoir 110 for storing a hydraulic brake fluid, a pump 112 for pumping the brake fluid from the reservoir 110, and an accumulator 114 for storing the brake fluid pumped by the pump 112. The accumulator 114 is provided with a pressure sensor 118 for sensing the pressure in the accumulator. The pump 112 is driven by a motor 122 which is operated under the control of a main control device 120, based on an output signal from the pressure sensor 118, so that the pressure of the fluid stored in the accumulator 114 is held within a predetermined range. Reference numerals 124 and 126 designate a relief valve and a fluid level sensor, respectively.

To the main control device 120 are connected a pedal switch 130 for sensing an operation of the brake pedal 14, a pedalling-force sensor 132 for sensing an operating force applied to the brake pedal 14, a vehicle-speed sensor 134 for sensing a running speed of the vehicle, and a deceleration sensor 136 for sensing a rate of deceleration of the vehicle. Based on output signals from these sensors, the main control device 120 controls the operations of the valve control circuit 56 and the solenoid-operated pressure regulating valve 116.

Figure 3:
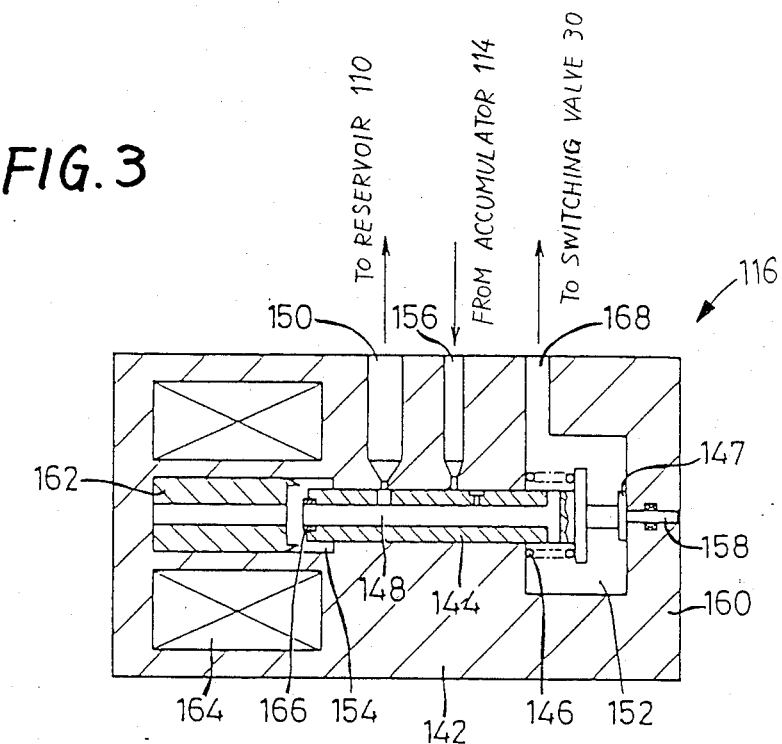
FIG. 3 is a front elevational view schematically showing an interior construction of a solenoid-operated pressure regulating valve used in the brake system.

Referring next to FIG. 3, the solenoid-operated pressure regulating valve 116 has a housing 142 made of a non-magnetic material. The housing 142 accommodates a valve spool 144 made of a magnetic material. The valve spool 144 is substantially fluid-tightly and slidably received within the housing 142. The spool 144 is normally held by a spring 146 in its original position in which a stop 147 formed with the spool 144 abuts on an inner surface of an end wall 160 of the housing 142. The valve spool 144 has a communication hole 148 formed therethrough. The housing 142 has a port 150 connected to the reservoir 110, a port 156 connected to the accumulator 114, and two fluid chambers 152, 154 to which the opposite ends portions of the spool 144 are exposed. In the original position of the valve spool 144, the communication hole 148 maintains fluid communcation between the fluid chambers 152, 154 and the reservoir 110 through the port 150. When the valve spool 144 is moved a small distance toward the fluid chamber 154, the communication hole 148 is disconnected from both of the ports 150 and 156, whereby the fluid chambers 152, 154 are disconnected from the reservoir 110 and the accumulator 114. When the valve spool 144 is moved a further distance from the original position toward the fluid chamber 154, the communication hole 148 is connected to the port 156, whereby the two fluid chambers 152, 154 are brought into communication with the accumulator 114.

The pressures in the two fluid chambers 152, 154 are maintained at the same level due to the communication hole 148 connecting the two chambers. The valve spool 144 is formed with a small-diameter piston portion 158 at its end exposed to the fluid chamber 152. This piston portion 158 fluid-tightly and slidably extends through the end wall 160 of the housing, such that the end of the piston portion 158 is exposed to the atmosphere. In this arrangement, the valve spool 144 is subjected to a force equal to a product S·P of a cross sectional area S of the piston portion 158, and a pressure P of the fluid within the fluid chambers 152, 154. Certainly, this force S·P acts on the spool 144 in a right direction (as viewed in FIG. 3) that causes the stop 147 to abut on the end wall 160.

The housing 142 incorporates a yoke 162 made of a magnetic material. The yoke 162 fixed in the housing 142 is positioned opposite to the end of the valve spool 144 remote from the piston portion 158, with a suitable distance therebetween when the spool 144 is placed in its original position. The yoke 162 is surrounded by a coil 164 also fixed in the housing 142. The end of the valve spool 144 opposite to the yoke 162 is provided with an annular stop member 166, so that a minimum distance between the spool 144 and the yoke 162 is established upon abutting contact of the stop member 166 on the yoke 162. This minimum distance is determined so that the communication hole 148 communicates with the port 156 when the annular stop member 166 abuts on the yoke 162. In this condition, a magnetic attractive force M produced by the yoke 162 to attract the valve spool 144 is proportional to an electric current I applied to the coil 164, as indicated by the following equation (1):

$$M = K \cdot I \tag{1}$$

where, K=constant

Further, an equilibrium of the forces exerted on the valve spool 144 is expressed by the following equation (2):

$$F + S \cdot P - M = 0 \tag{2}$$

where, F=biasing force of the spring 146

From the above equations (1) and (2), the following equation (3) may be obtained:

$$P = K \cdot I/S - F/S \tag{3}$$

Figure 4:
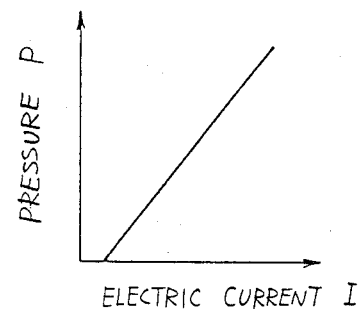
FIG. 4 is a graph indicating an operating characteristic of the solenoid-operated pressure regulating valve of FIG. 3.

The above equation (3) indicates that the pressure P in the fluid chambers 152, 154 increases in proportion to the electric current I applied to the coil 164, as shown in FIG. 4. This pressure P is supplied through the port 168 and the fluid passage 34 to the switching valve 30.

As desribed below in detail, the main control device 120 controls the solenoid-operated pressure regulating valve 116, based on the outputs of the pedal switch 130, pedalling-force sensor 132, vehicle-speed sensor 134 and deceleration sensor 136. Therefore, these switch and sensors 130, 132, 134, 136 and the main control device 120 cooperate with the second pressure source 32, to provide electrically controlled pressure generating means for generating an electrically controlled braking pressure applied to the switching valve 30.

The manually/electrically operated brake system constructed as described above is operated in the following manner.

When the brake pedal 14 is operated, this operation is sensed by the pedal switch 130. Upon reception of an output signal from the pedal switch 130, the main control device 120 activates the valve control circuit 56 to control the solenoid-operated shutoff valves 44, 46, according to the currently selected position of the selector switch 58.

As the brake pedal 14 is depressed, the pressure in the master cylinder 10 is raised. At the same time, an operating force or a force of depression exerted on the brake pedal 14 is sensed by the pedalling-force sensor 132. Based on an output signal from the sensor 132, the main control device 120 applies a controlled electric current to the coil 164 of the solenoid-operated pressure regulating valve 116 of the second pressure source 32. As a result, an electrically controlled braking pressure generated by the pressure regulating valve 116 is applied to the switching valve 30. Since the main control device 120 controls the valve 116 so that the electrically controlled braking pressure generated by the valve 116 is always higher than the manually controlled pressure generated by the master cylinder, the switching valve 30 is operated to supply the electrically controlled braking pressure to the wheel brake cylinders 24, 26.

As the vehicle is decelerated with the electrically controlled braking pressure applied to the wheel brake cylinders 24, 26, a rate of deceleration of the vehicle is detected by the deceleration sensor 136. An output signal from the deceleration sensor 136 indicates an actual braking effect obtained by the wheel brake cylinders 24, 26. The main control device 120 updates the amount of an electric current applied to the coil 164, so that the level of the output signal of the deceleration sensor 136 coincides with a target or desired value, which is predetermined as a function of the output of the pedalling-force sensor 132 indicative of the operating force of the brake pedal 14. In other words, the selectric current to be applied to the coil 164, and consequently the braking pressure generated by the pressure regulating valve 116, are adjusted so that the detected actual braking effect (deceleration rate of the vehicle) coincides with a required braking effect predetermined based on the detected specific operating force applied to the brake pedal 14. Therefore, the vehicle may be decelerated as a function of the force of depression exerted on the brake pedal 14, independently of different friction coefficients of the individual wheel brakes, which may vary during each operation of the brakes.

The target value of the deceleration rate indicated above is determined based also on the vehicle speed at which the operation of the brake pedal 14 is sensed. That is, the main control device 120 determines the target or desired deceleration rate based on the output signal of the vehicle-speed sensor 134, as well as on the output signal of the pedalling-force sensor 132.

While the electrically controlled braking pressure generated by the solenoid-operated pressure regulating valve 116 is applied to the wheel brake cylinders 24, 26, the master cylinder 10 is disconnected by the switching valve 30 from the wheel brake cylinders 24, 26. In this condition, the amount of the brake fluid that can be delivered from the master cylinder 10 upon depression of the brake pedal 14 is varied depending upon the states of the solenoid-operated shutoff valves 44, 46, i.e., the currently selected one of the first, second and third modes of the shutoff valves 44, 46 previously discussed. Described more specifically, the two shutoff valves 44, 46 are both closed if the selector switch 58 is set at a "HARD (SHORT)" position. In this case, only a very limited volume of the brake fluid is permitted to be delivered from the master cylinder 10. Consequently, the operating stroke of the brake pedal 14 is accordingly very limited, and therefore the force of depression on the brake pedal 14 suddenly increases. This gives the vehicle driver a hard pedalling feel, with a comparatively short operating stroke of the pedal 14. If the selector switch 58 is set at a "NORMAL" position, only the shutoff valve 44 is held open while the other shutoff valve 46 remains closed. In this instance, the brake fluid delivered from one of the two pressure chambers of the master cylinder 10 may be accommodated in the fluid absorber 36, while only a very limited amount of the brake fluid is permitted to be delivered from the other pressure chamber. Consequently, the brake pedal 14 gives a normal pedalling feel, with an intermediate value of the operating stroke, and an intermediate rate of increase in the depression force. If the selector switch 58 is set at a "SOFT (LONG)" position, the two shutoff valves 44, 46 are both open, whereby the two fluid absorbers 36, 38 may accommodate the brake fluid delivered from the two pressure chambers of the master cylinder 10. Therefore, the brake pedal 14 can be operated with a comparatively large stroke, with a relatively low rate of increase in the depression force. This gives a relatively soft pedalling feel.

Thus, the instant brake system permits the vehicle driver to select desired one of the three different operating feels of the brake pedal 14. However, the obtained rate of deceleration of the vehicle, or the actual braking effect, may accurately correspond to the operating force exerted on the brake pedal 14, since the electrically controlled braking pressure applied to the wheel brake cylinders 24, 26 is so determined and since the master cylinder 10 is disconnected from the cylinders 24, 26.

In the case where the selector switch 58 is operated after the pedal switch 130 has sensed an operation of the brake pedal 14, the valve control circuit 56 maintain the current states of the shutoff valves 44, 46, in order to avoid a change in the operating feel of the brake pedal 14 during a single pedalling action of the pedal 14.

In the event of an electrical failure of the second pressure source 32, main control device 120 and the various sensors indicated above, electric currents applied to the valve control circuit 56 and the pressure regulating valve 116 are immediately removed. As a result, the pressure regulating valve 116 does not supply the switching valve 30 with an electrically controlled braking pressure upon depression of the brake pedal 14. Instead, the switching valve 30 is placed in a position for supplying the wheel brake cylinders 24, 26 with a manually controlled braking pressure generated by the master cylinder 10. Further, the shut-off valves 44, 46 are placed in the first mode, wherein the both valves 44, 46 are held closed. Consequently, the pressurized fluid delivered from the master cylinder 10 is applied to the wheel brake cylinders 24, 26, as in an ordinary manually operated hydraulic brake system. Thus, the present manually/electrically operated brake system permits the wheel brake cylinders 24, 26 to be activated in a reliable manner to decelerate or stop the vehicle, even in the event of a failure or trouble in the electrical system.

While the present invention has been described in its preferred embodiment, it is to be understood that the invention is not limited to the precise details of the illustrated embodiment, but may be embodied with various changes, modifications and improvements, which may occur to those skilled in the art.

In the illustrated embodiment discussed above in detail, the second pressure source 32 is used to provide a single electrically controlled braking pressure applied to both of the rear wheel brake cylinders 24 and the front wheel brake cylinders 26. However, it is possible to modify the second pressure source 32 and the main control device 120 so that the rear wheel brake cylinders 24 and the front wheel brake cylinders 26 are supplied with respective electrically controlled pressures that are controlled independently of each other.

Although the illustrated embodiment is adapted to provide a rate of deceleration of the vehicle which is substantially linearly proportional to the operating force applied to the brake pedal 14, it is possible that the deceleration rate has a non-linear relation with the operating force of the brake pedal.

It is also possible to provide a non-linear relation between the operating force and stroke of the brake pedal 14, by giving the springs 54 of the fluid absorbers 36, 38 a non-linear strain-stress relation. Further, it is possible to control the pressure regulating valve 116 so that the obtained deceleration rate of the vehicle corresponds to the operating stroke of the brake pedal, rather than the operating force.

The electrically controlled braking pressure generated by the electrically controlled second pressure source 32 may be employed to perform an anti-skid or anti-lock control for preventing the vehicle wheels from locking upon brake application, or to effect a traction control for preventing the vehicle wheels from slipping upon starting of the vehicle.

It is understood that various other changes, modifications and improvements may be made in the invention, without departing from the spirit and scope of the present invention defined in the appended claims.

What is claimed is:

1. A manually/electrically operated brake system for applying a brake to a wheel of a vehicle, comprising:
   a brake operating member;
   a master cylinder operated by said brake operating member, to generate a manually controlled fluid braking pressure according to an operation of said brake operating member;
   a wheel brake cylinder for applying a brake to said wheel;
   a primary fluid passage for connecting said master cylinder to said wheel brake cylinder;
   electrically controlled pressure generating means for generating an electrically controlled fluid braking pressure to produce a required braking effect which is determined based on at least one of an operating force and an operating stroke of said brake operating member;
   switching valve means provided in said primary fluid passage, for applying said electrically controlled braking pressure to said wheel brake cylinder while disconnecting said master cylinder from said wheel brake cylinder when said electrically controlled pressure generating means is operative, and for applying said manually controlled braking pressure to said wheel brake cylinder while disconnecting said electrically controlled pressure generating means from said wheel brake cylinder in the event of a failure of said electrically controlled pressure generating means; and
   at least one fluid absorber connected to a part of said primary fluid passage between said switching means and said master cylinder, for temporarily accommodating the brake fluid of said manually controlled braking pressure delivered from said master cylinder upon operation of said brake operating member, said at least one fluid absorber returning the brake fluid therefrom to said master cylinder upon releasing of said brake operating member.

2. A manually/electrically operated brake system according to claim 1, further comprising absorber control means disposed between said at least one fluid absorber and said primary fluid passage, for effecting fluid communication between said primary fluid passage and said at least one fluid absorber when said electrically controlled pressure generating means is normally functioning, and for disconnecting said at least one fluid absorber from said primary fluid passage when said electrically controlled pressure generating means fails to normally function.

3. A manually/electrically operated brake system according to claim 2, wherein said at least one fluid absorber consists of a plurality of fluid absorbers, said absorber control means being operable to control said plurality of fluid absorbers selectively in one of a plurality of operating modes associated with fluid communcation between said fluid absorbers and said primary fluid passage.

4. A manually/electrically operated brake system according to claim 3, wherein said plurality of fluid absorbers consist of a first fluid absorber and a second fluid absorber, and said absorber control means comprises a first solenoid-operated shutoff valve disposed between said first fluid absorber and said primary fluid passage, a second solenoid-operated shutoff valve disposed between said second fluid absorber and said primary fluid passage, and valve control means operable to control said first and second shutoff valves selectively in one of a first mode in which said first and second shutoff valves are closed, a second mode in which one of said first and second is open, and a third mode in which said first and second shutoff valves are open.

5. A manually/electrically operated brake system for applying a brake to a wheel of a vehicle, comprising:
   a brake operating member;
   a master cylinder operated by said brake operating member, to generate a manually controlled fluid braking pressure according to an operation of said brake operating member;
   a wheel brake cylinder for applying a brake to said wheel;
   a primary fluid passage for connecting said master cylinder to said wheel brake cylinder;
   electrically controlled pressure generating means for generating an electrically controlled fluid braking pressure to produce a required braking effect which is determined based on at least one of an operating force and an operating stroke of said brake operating member; and
   switching valve means provided in said primary fluid passage, for applying said electrically controlled braking pressure to said wheel brake cylinder while disconnecting said master cylinder from said wheel brake cylinder when said electrically controlled pressure generating means is operative, and for applying said manually controlled braking pressure to said wheel brake cylinder while disconnecting said electrically controlled pressure generating means from said wheel brake cylinder in the event of a failure of said electrically controlled pressure generating means;
   said electrically controlled pressure generating means comprising:
   a reservoir for storing a brake fluid;
   a pump for pumping the brake fluid from said reservoir;
   an accumulator for storing the brake fluid pumped by said pump, at a pressure within a predetermined range;
   an operating-force sensor for sensing the operating force applied to said brake operating member;
   a braking-effect sensor for sensing an actual braking effect provided by said wheel brake cylinder;
   a solenoid-operated pressure regulating valve disposed in a fluid passage between said accumulator and said switching means, for supplying said electrically controlled braking pressure to said switching means, by reducing the pressure of the brake fluid supplied from said accumulator; and main control means for controlling said solenoid-operated pressure regulating valve such that said electrically controlled braking pressure is determined so that said actual braking effect sensed by said braking-effect sensor coincides with said required braking effect determined based on said operating force sensed by said operating-force sensor.

6. A manually/electrically operated brake system according to claim 5, wherein a supply of an electric current to said solenoid-operated pressure regulating valve is inhibited in the event of a failure of at least one of said main control means, said operating-force sensor and said braking-effect sensor.

* * * * *